(12) United States Patent
Manalo

(10) Patent No.: US 9,026,107 B2
(45) Date of Patent: May 5, 2015

(54) METHOD FOR INSTANT REGISTRATION OF A ROAMING UE ONTO A PREFERRED VPLMN FROM A NON-PREFERRED VPLMN

(75) Inventor: Robert E. Manalo, North York (CA)

(73) Assignee: TELUS Communications Company, Edmonton (CA)

( * ) Notice: Subject to any disclaimer, the term of this patent is extended or adjusted under 35 U.S.C. 154(b) by 762 days.

(21) Appl. No.: 13/212,132

(22) Filed: Aug. 17, 2011

(65) Prior Publication Data

US 2013/0045737 A1 Feb. 21, 2013

(30) Foreign Application Priority Data

Dec. 10, 2010 (CA) ...................................... 2724871

(51) Int. Cl.
*H04W 4/00* (2009.01)
*H04W 60/04* (2009.01)
*H04W 8/06* (2009.01)
*H04W 48/18* (2009.01)

(52) U.S. Cl.
CPC ................ *H04W 60/04* (2013.01); *H04W 8/06* (2013.01); *H04W 48/18* (2013.01)

(58) Field of Classification Search
CPC .............................. H04W 48/18; H04W 60/04
USPC ............ 455/432.1, 58, 411, 410, 419, 456.1, 455/405, 433, 456.3, 558, 432.3, 404.1; 370/338
See application file for complete search history.

(56) References Cited

U.S. PATENT DOCUMENTS

| | | |
|---|---|---|
| 7,072,651 B2 | 7/2006 | Jiang |
| 7,089,001 B2 | 8/2006 | Leung |
| 7,127,245 B2 | 10/2006 | Almgren |
| 7,139,570 B2 | 11/2006 | Elkarat |
| 7,366,510 B2 | 4/2008 | Gunaratnam |
| 7,383,054 B2 | 6/2008 | Chou |
| 7,389,109 B2 | 6/2008 | Hind |
| 7,447,499 B2 | 11/2008 | Bridges |
| 7,818,024 B2 | 10/2010 | Gunaratnam |
| 7,929,953 B2 | 4/2011 | Jiang |
| 8,229,431 B2 | 7/2012 | Buckley |
| 2005/0037737 A1 | 2/2005 | Aubert |
| 2006/0052100 A1* | 3/2006 | Almgren ..................... 455/432.1 |
| 2006/0217153 A1 | 9/2006 | Coles |
| 2007/0213050 A1 | 9/2007 | Jiang |
| 2009/0215447 A1 | 8/2009 | Catalano |
| 2009/0215449 A1 | 8/2009 | Avner |
| 2009/0318148 A1* | 12/2009 | Zinn et al. .................. 455/435.2 |
| 2010/0099403 A1 | 4/2010 | Kim |
| 2010/0136967 A1 | 6/2010 | Du |
| 2010/0190497 A1 | 7/2010 | Pudney |
| 2011/0075608 A1 | 3/2011 | Chai |

(Continued)

FOREIGN PATENT DOCUMENTS

| | | |
|---|---|---|
| CA | 2 478 576 A1 | 9/2003 |
| CA | 2 504 497 A1 | 5/2004 |

(Continued)

OTHER PUBLICATIONS

US 7,526,319, 04/2009, Aubert (withdrawn)

*Primary Examiner* — Kiet Doan
(74) *Attorney, Agent, or Firm* — Christensen O'Connor Johnson Kindness PLLC

(57) ABSTRACT

A User Equipment (UE) that was registered on a non-preferred network operator may be forced to register immediately and seamlessly onto another available more preferred network operator by updating the EF_LOCI in the UICC with the MCCMNC (i.e. PLMN ID) of the preferred network operator and then sending the REFRESH—3G Session Reset command to the Mobile Equipment (ME).

16 Claims, 21 Drawing Sheets

(56) References Cited

U.S. PATENT DOCUMENTS

| | | |
|---|---|---|
| 2012/0309374 A1 | 12/2012 | Tagg |
| 2012/0322474 A1 | 12/2012 | Moisanen |

FOREIGN PATENT DOCUMENTS

| | | |
|---|---|---|
| CA | 2 517 581 A1 | 5/2005 |
| CA | 2 545 824 A1 | 5/2005 |
| CA | 2 498 430 A1 | 8/2005 |
| CA | 2 727 750 A1 | 3/2006 |
| CA | 2 577 689 A1 | 8/2007 |
| EP | 1 672 943 A1 | 6/2006 |
| EP | 1 527 653 | 10/2007 |
| EP | 2 437 551 A1 | 4/2012 |
| WO | 2008/027660 A2 | 3/2008 |

\* cited by examiner

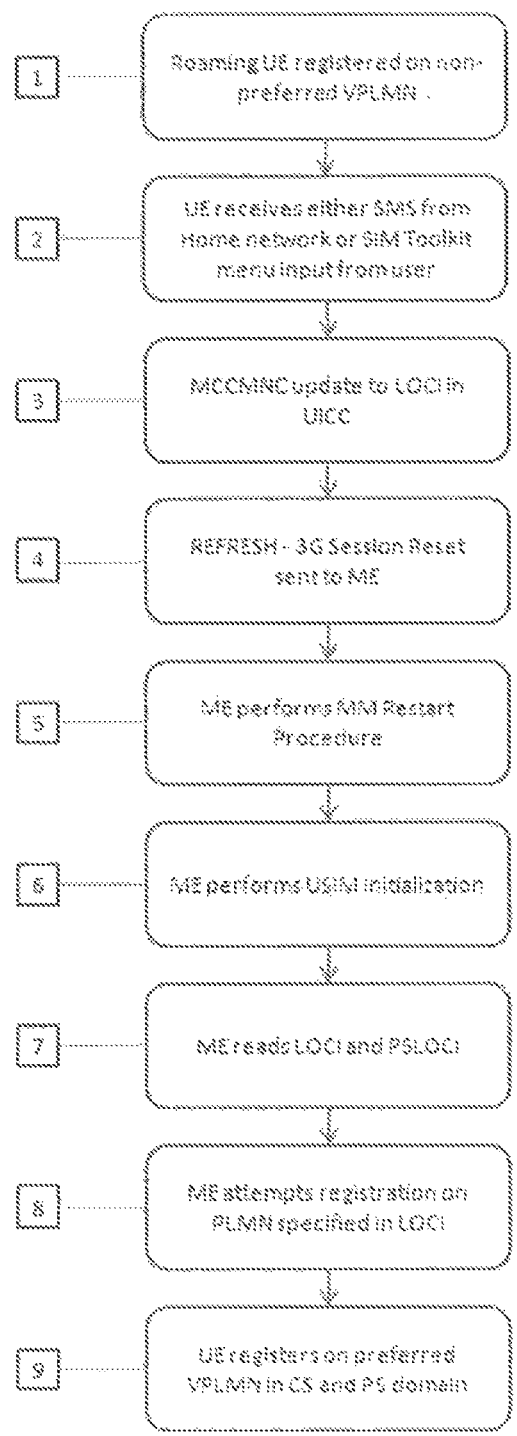

Figure 2: UE is powered ON

Figure 3: ME reads last registered PLMN in EF_LOCI

Figure 4: ME reads last registered PLMN in EF_PSLOCI

Figure 5: ME reads if any PLMNs are listed in EF_OPLMNwAcT list

Figure 6: ME performs CS Authentication on last registered PLMN

Figure 7: CS registration on last registered PLMN is successful

Figure 8: Normal Service on non-preferred 302-880 VPLMN in CS Domain

Figure 9: ME performs PS Authentication on last registered PLMN

Figure 10: PS registration on last registered PLMN is successful

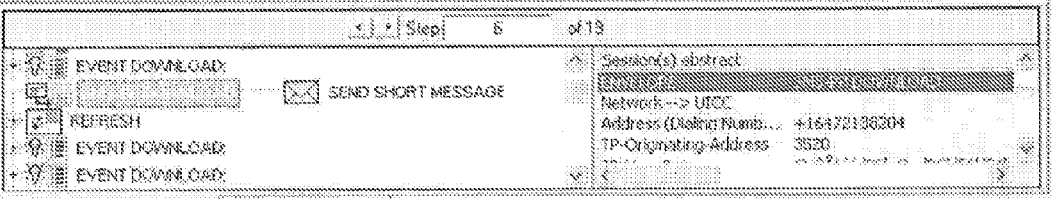
Figure 11: UE receives SMS from Home Network

Figure 12: REFRESH – 3G Session Reset is sent to the ME

Figure 13: ME re-reads EF_LOCI containing updated MCCMNC during USIM Initialization process Figure 14: UE re-reads PSLOCI containing updated MCCMNC during USIM Initialization process Figure 15: ME performs REFRESH – 3G Session Reset successfully Figure 16: ME performs CS Authentication on updated last registered PLMN Figure 17: ME performs PS Authentication Figure 18: PS registration on updated last registered PLMN is successful Figure 19: CS registration on updated last registered PLMN is successful

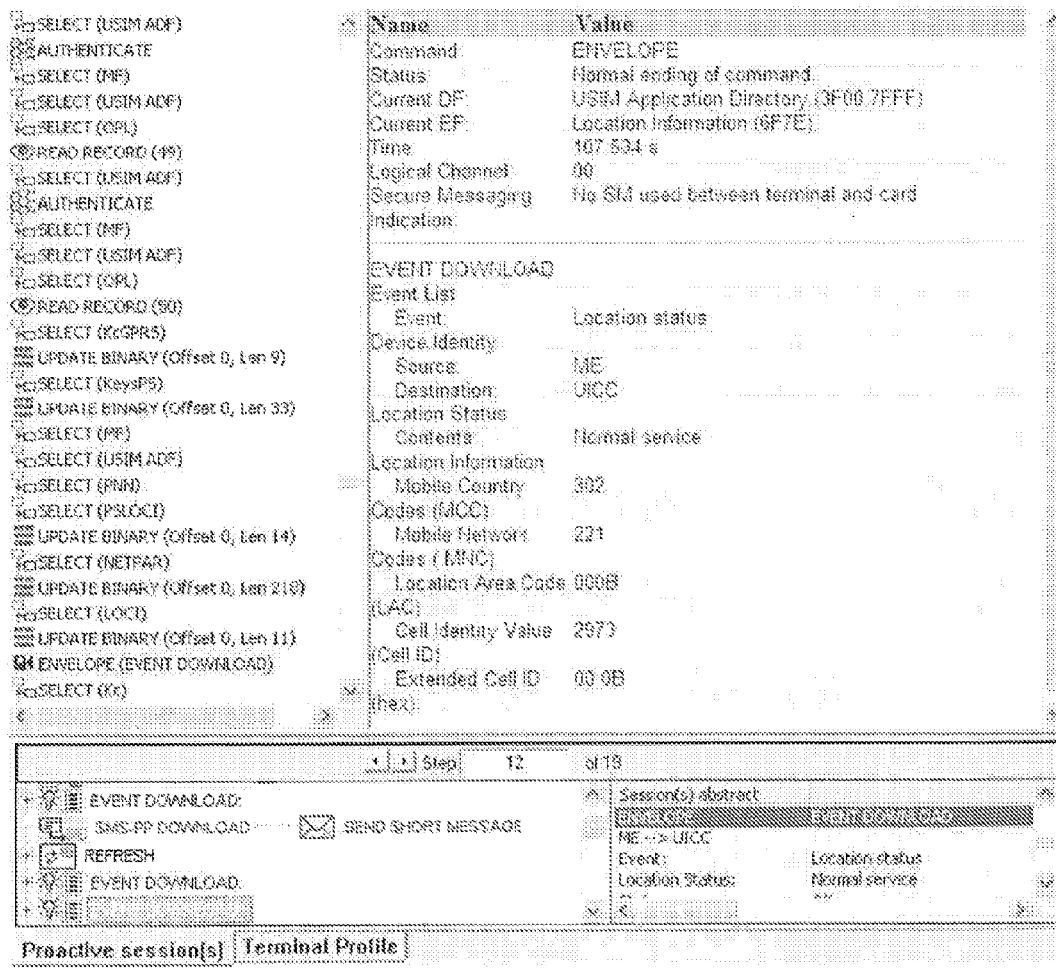
Figure 20: UE is fully registered on more preferred 302-221 VPLMN in ~10 seconds after REFRESH

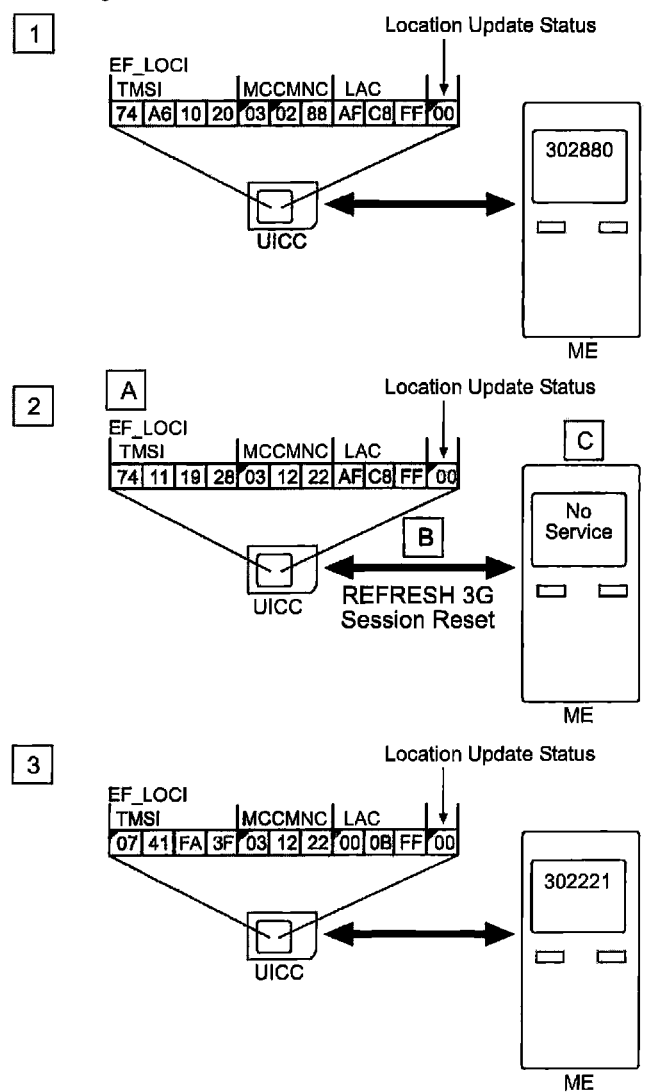
Figure 21: UICC and ME interaction

METHOD FOR INSTANT REGISTRATION OF A ROAMING UE ONTO A PREFERRED VPLMN FROM A NON-PREFERRED VPLMN

FIELD

Network Selection Procedure of a Mobile Equipment through interaction with updates to and commands from the UICC.

BACKGROUND AND SUMMARY

The disclosed method is an innovative new seamless instant registration method by which a roaming UE that is in Automatic Network Selection mode and registered on a non-preferred visited network, can be forced to immediately register seamlessly within seconds onto another available more preferred visited network. The general method by which this can be accomplished is by updating a specific file in the UICC with specific content, followed by a sending a specific REFRESH command to the ME. This method can be deployed using either a commercial OTA solution or a SIM Toolkit Application in the UICC.

When a roaming UE is powered on in a foreign country with multiple visited networks available, for which registration is possible (due to bilateral network agreements), if the ME is set to Automatic Network Selection mode (which typically is the default setting), the ME follows the Network Selection Procedures outlined in 3 GPP TS 23.122 clause 4.4.3.1 and 4.4.3.3.

There are some scenarios where if the OPLMNwAcT preferred roaming list in the UICC is empty or not updated with the latest more preferred network, then the roaming UE may register onto a less preferred visited network that the home operator would not want their client's UE to register onto. Reasons may be higher roaming costs and/or fewer services such as 3 G data offered on the less preferred network.

In these scenarios, the following United States patent documents generally describe an OTA network based solution in which to steer a clients UE (i.e. via OTA updates to the LOCI and PLMN list followed by a REFRESH) to a more preferred visited network: U.S. Pat. No. 7,127,245 Almgren and U.S. Pat. No. 7,139,570 Elkarat et al.

However, the specific method for how to accomplish the seamless and instant registration behaviour of the UE onto the more preferred visited network after the OTA update is not covered in these patents, for which the descriptions and claims presented in these Prior Arts are obscure and ambiguous in this regard and leave the reader who is skilled in this subject matter area to spend countless hours experimenting and testing with different REFRESH command combinations with different combinations of LOCI updates.

Described are some examples of the challenges and limitations of the at least some previous methods. First, if the LOCI file is updated with the PLMN ID of the preferred visited network, but the Location update status byte 11 is set to a value other than "00", then seamless and instant registration will not work for all MEs, regardless of which REFRESH command is used after the LOCI file is updated. Second, if the LOCI file is updated with the PLMN ID of the preferred visited network, but the TMSI value of "FF FF FF FF" is specified in bytes 1 to 4, then seamless and instant registration will not work in some MEs, even if used with REFRESH—3G Session Reset. Third, even if the LOCI file is properly updated by updating the PLMN ID of the preferred PLMN, while keeping the TMSI and Location update status intact with the previous values (i.e. non-"FF FF FF FF" TMSI value and Location update status set to "00"), usage of REFRESH—File Change Notification will not accomplish instant registration onto the preferred network on all MEs. Fourth, even if the LOCI file is properly updated by updating the PLMN ID of the preferred PLMN, while keeping the TMSI and Location update status intact with the previous values, usage of REFRESH—UICC Reset will not accomplish seamless and instant registration on MEs that implement a "Cold Reset" procedure, in which the ME performs a powercycle which will give the client the perception that the UE has malfunctioned. Fifth, only REFRESH—3G Session Reset specifies a re-initialization of a network connection through the MM Restart Procedure as per 3GPP TS 31.111 clause 6.4.7. As such, it is not guaranteed and required as per 3 GPP standards (unless there is an IMSI change as per 3 GPP TS 11.14 clause 6.4.7.1) that all MEs using other REFRESH commands, will perform a new network selection attempt on the preferred PLMN using the updated LOCI, even if the LOCI file is properly updated by updating the PLMN ID of the preferred PLMN, while keeping the TMSI and Location update status intact with the previous values.

Therefore, the disclosed method is a novel improvement to these methods, which focuses on only updating the MCC-MNC content in the LOCI file with the preferred PLMN while keeping the TMSI and Location update status intact with the previous values, followed by a REFRESH—3 G Session Reset command to the ME, in order to obtain immediate registration within seconds, for which there is no precedence.

Furthermore, the method for seamless instant registration through an MCCMNC update to the LOCI file followed by REFRESH—3G Session Reset to the ME, can also be accomplished through a SIM Toolkit application, in which perhaps the user, via a SIM Toolkit menu in the ME UI, selects the current visited country from a list of countries shown followed by selecting a predefined Network Name associated to the preferred PLMN code of the selected visited country. Once selected, the SIM Toolkit app proceeds with carrying out the disclosed method.

In conjunction to using the method for seamless instant registration onto the preferred visited network, the OPLMNwAcT file in the UICC can also be updated (i.e. using either OTA solution or SIM Toolkit) with the preferred visited network PLMN ID as higher priority over other PLMN IDs (if populated in the OPLMNwAcT list) of the same visited country, followed by sending the REFRESH—3 G Session Reset command to the ME. This will help keep the UE registered on the preferred visited network, if available, during an HPPLMN rescan.

In the future, a new REFRESH command requirement specified in 3 GPP Release 7, REFRESH—Steering of Roaming, is aimed to provide similar instant and seamless registration behaviour as the disclosed method. However, REFRESH—Steering of Roaming is only applicable to Release 7 and higher MEs, and is not specified to work with today's current MEs, most of which are pre-Release 7. Therefore, the practicality of this new REFRESH command is not yet feasible.

BRIEF DESCRIPTION OF FIGS.

There will now be described embodiments of the disclosed method with reference to the drawings by way of example, in which:

FIG. 1 is a flow diagram showing an example of the method steps disclosed;

FIGS. 2-20 are screen shots illustrating the disclosed method steps; and

FIG. 21 is a schematic containing steps 2A, 2B, 2C and 3 that distinguish between method steps taken by the UICC and the ME.

DETAILED DESCRIPTION

The disclosed method leverages the expected behaviour of the ME as outlined in the following 3 GPP requirements:

3 GPP TS 23.122 clause 4.4.3.1—At switch on or recovery from lack of coverage At switch on, or following recovery from lack of coverage, the MS selects the registered PLMN or equivalent PLMN (if it is available) using all access technologies that the MS is capable of and if necessary (in the case of recovery from lack of coverage, see clause 4.5.2) attempts to perform a Location Registration.

3 GPP TS 31.111 clause 6.4.7—REFRESH: 3 G Session Reset. This mode causes the ME to reset the 3 G session, in accordance with the 3 G session reset procedure defined in TS 31.102 [14]. Subsequently, the ME performs the "USIM Initialization and File Change Notification" procedure and the MM Restart procedure as defined in TS 23.122 [7].

3 GPP TS 23.12.2 clause 4.8—MM Restart procedure: In some cases, e.g. on change of SIM data, there is a need for the MM to be restarted without the need for user intervention. To perform the procedure the MS shall behave as if the SIM is removed and afterwards a new SIM is inserted.

3 GPP TR 22.811 clause 5.4—Customer expectations: Following switch-on if the last registered PLMN is available, and no higher priority PLMN is available (e.g. HPLMN) the user should be registered on that PLMN (typically within 5 seconds). This period includes the execution of any 3 GPP defined functionality as described above.

Based on the above 3 GPP requirements, it can be Summarized that:

1) The ME will first attempt the last registered PLMN.
2) If the last registered PLMN is available and allowable, then the UE should register on that PLMN within 5 seconds.
3) REFRESH—3G Session Reset will cause the ME to reset the 3G session, followed by USIM Initialization and File Change Notification, then performing an MM Restart (i.e. similar behaviour to removing and reinserting a new SIM).

Therefore, when a UE is registered on a non-preferred network, by overwriting the MCCMNC in the EF_LOCI file, and applying 3) above, the ME upon completing 3) will then proceed to 1) and attempt to register on the PLMN ID that was updated in the EF_LOCI, which the ME now considers as the last registered PLMN and completes 2), although registration will be within 30 seconds.

Note that when updating EF_LOCI with the PLMN ID of the preferred PLMN, depending on the GUI of the OTA Platform solution or SIM Toolkit Application, the user can either enter the PLMN ID of the preferred PLMN in decimal value (i.e. 310410) which will be converted to raw hex format (i.e. 13 00 14) used by the UICC, or enter the PLMN ID directly in raw hex format.

Therefore, in an embodiment, there is disclosed a method of forcing a UE that is in Automatic Network Selection mode and is registered on a non-preferred visited network to register onto an available preferred visited network by the steps comprising overwriting an entry in an elementary file containing location information in the UE with identification for the preferred network, then sending a refresh command to the ME. In an embodiment, the method steps comprise overwriting the MCCMNC content of EF_LOCI (i.e. bytes 5, 6 and 7 of File ID 6F7E) in the USIM ADF within the UICC, with the PLMN ID of an available preferred visited network, and then sending to the ME the refresh command REFRESH—3 G Session Reset (containing EF_LOCI in the REFRESH File List).

FIG. 1 shows a flow diagram of the method of an embodiment of the disclosed method, for which the subsequent FIGS. 2 to 20, showing UICC-ME COMPRION IT3 Prov! log file screen captures makes reference to.

Figure 2:
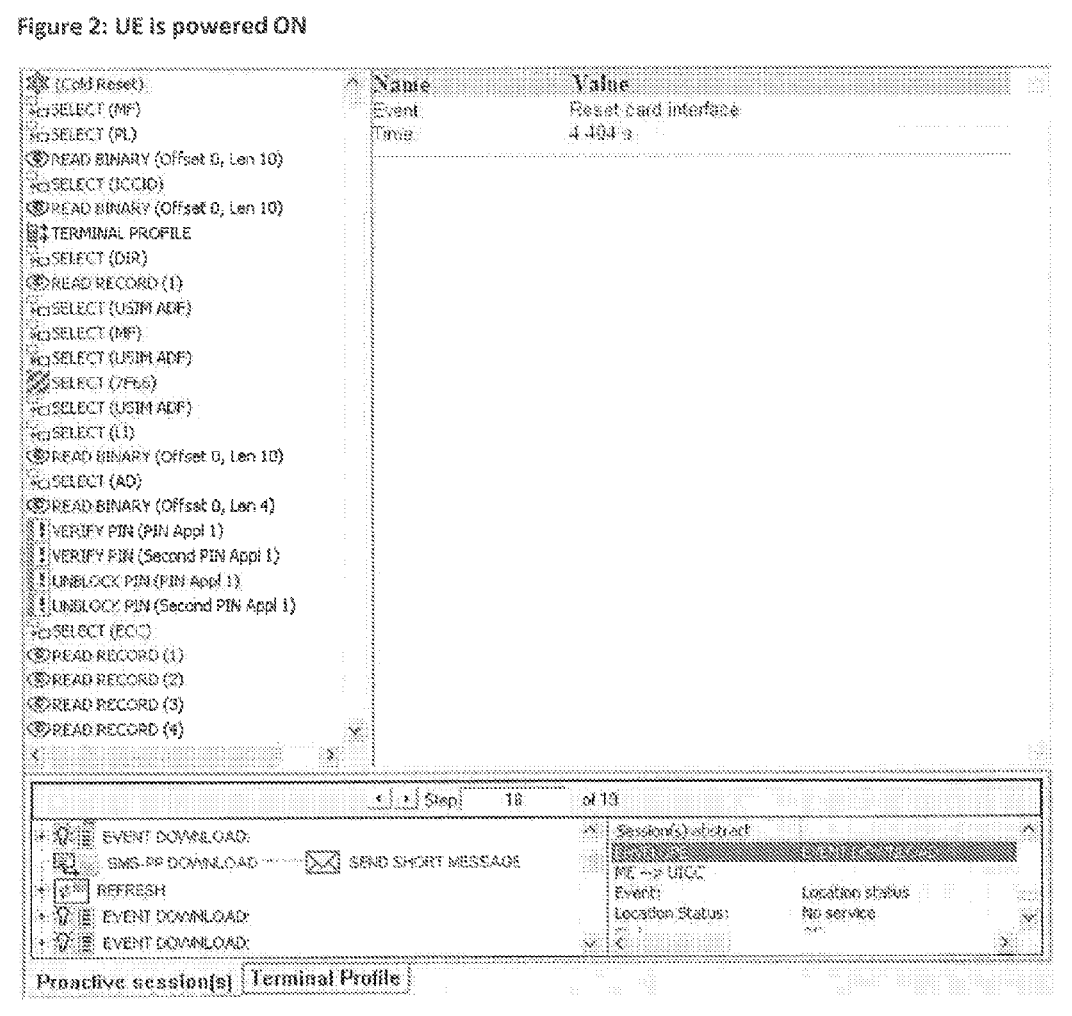
Figure 3:
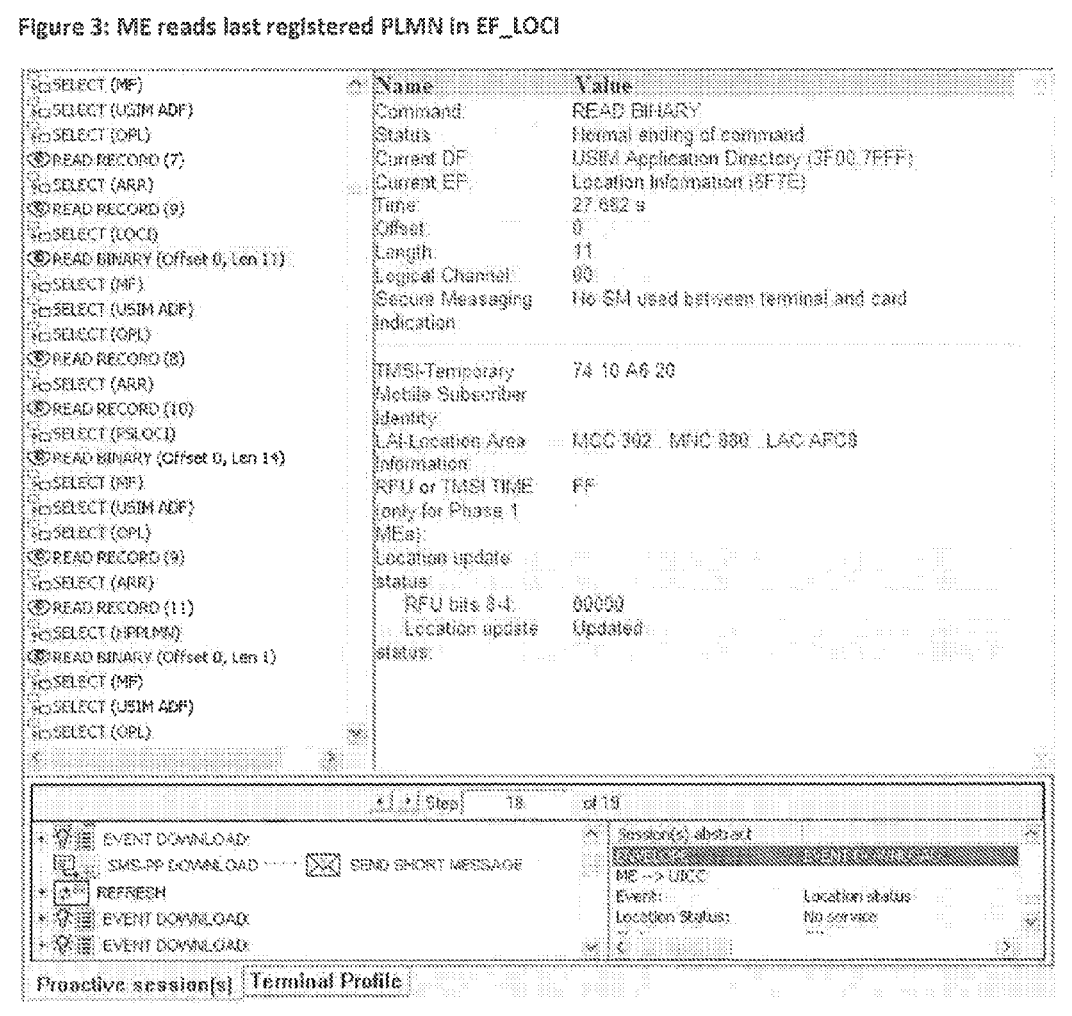

FIG. 2 shows a screen shot of the UICC-ME log file where the UE is powered on and the ME begins reading the UICC files @ 4.404 s, FIG. 3 shows the EF_LOCI first being read by the ME @ 27.682 s. The UE in this case was previously CS registered on PLMN 302-880, since the TMSI is populated and the Location update status is shown as "updated."

Figure 4:
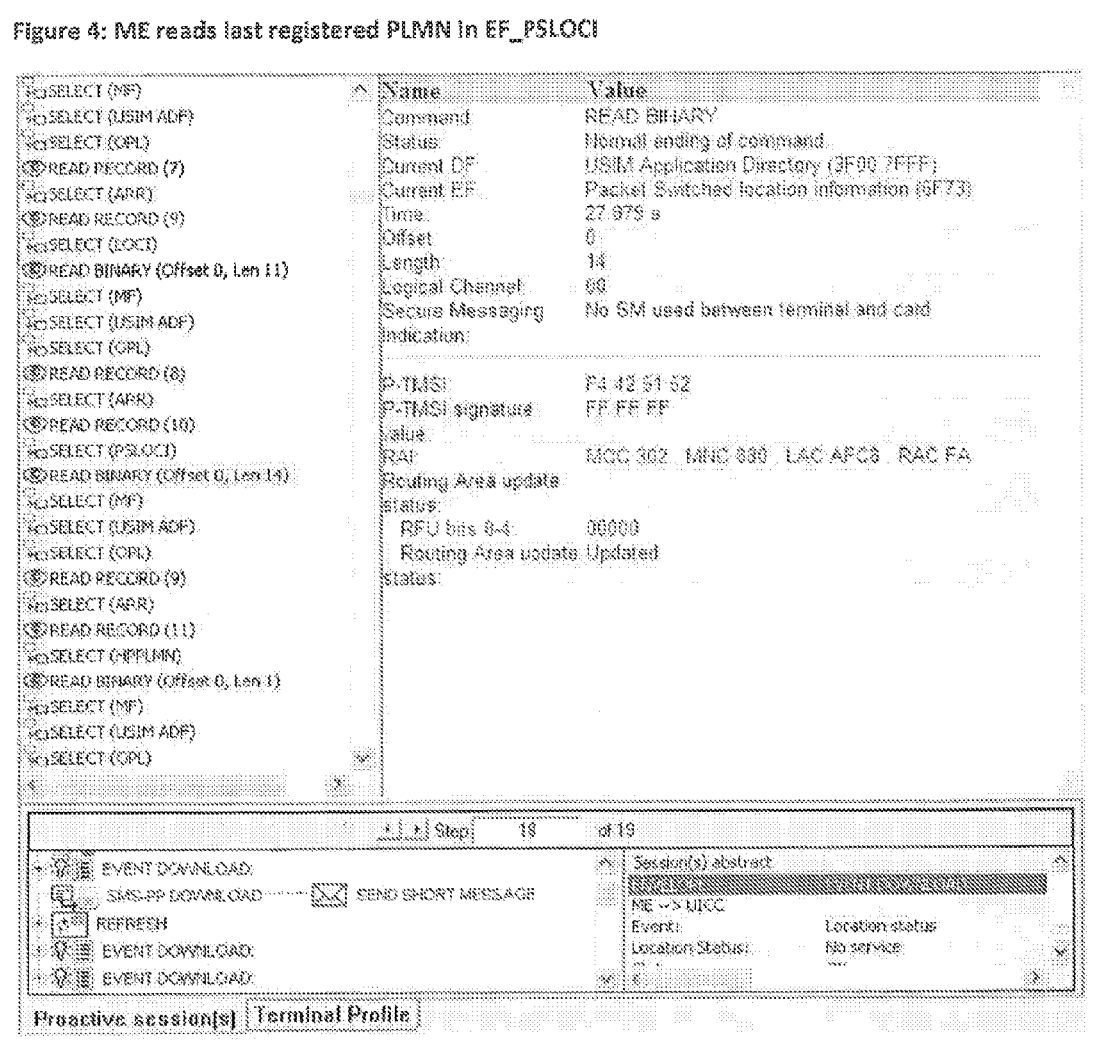

FIG. 4 shows the EF_PSLOCI first being read by the ME @ 27.879 s. The UE in this case was previously PS registered on PLMN 302-880, since the P-TMSI is populated and the Routing Area update status is shown as "updated."

FIG. 5 shows the EF_OPLMNwAcT being read by the ME @ 29.087 s. Although the screen shot does not fully show this EF in its entirety, the entries in this EF are all empty. This means that the ME will continue to use the last registered PLMN found in the EF_LOCI and EF_PSLOCI even during an HPPLMN rescan, since there are no PLMNs listed that are of higher priority.

Figure 6:
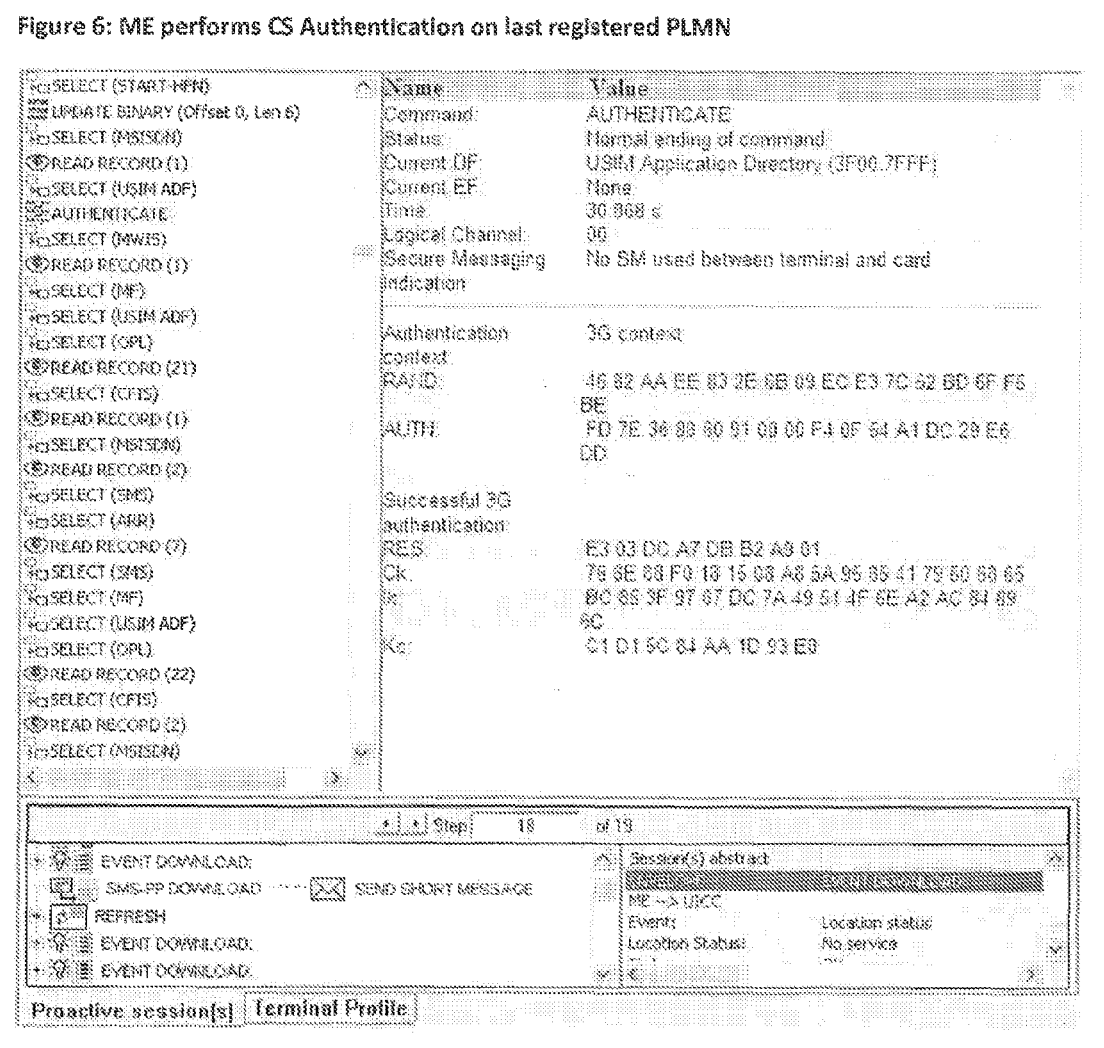

FIG. 6 shows the ME performing CS Authentication @ 30.868 s.

Figure 7:
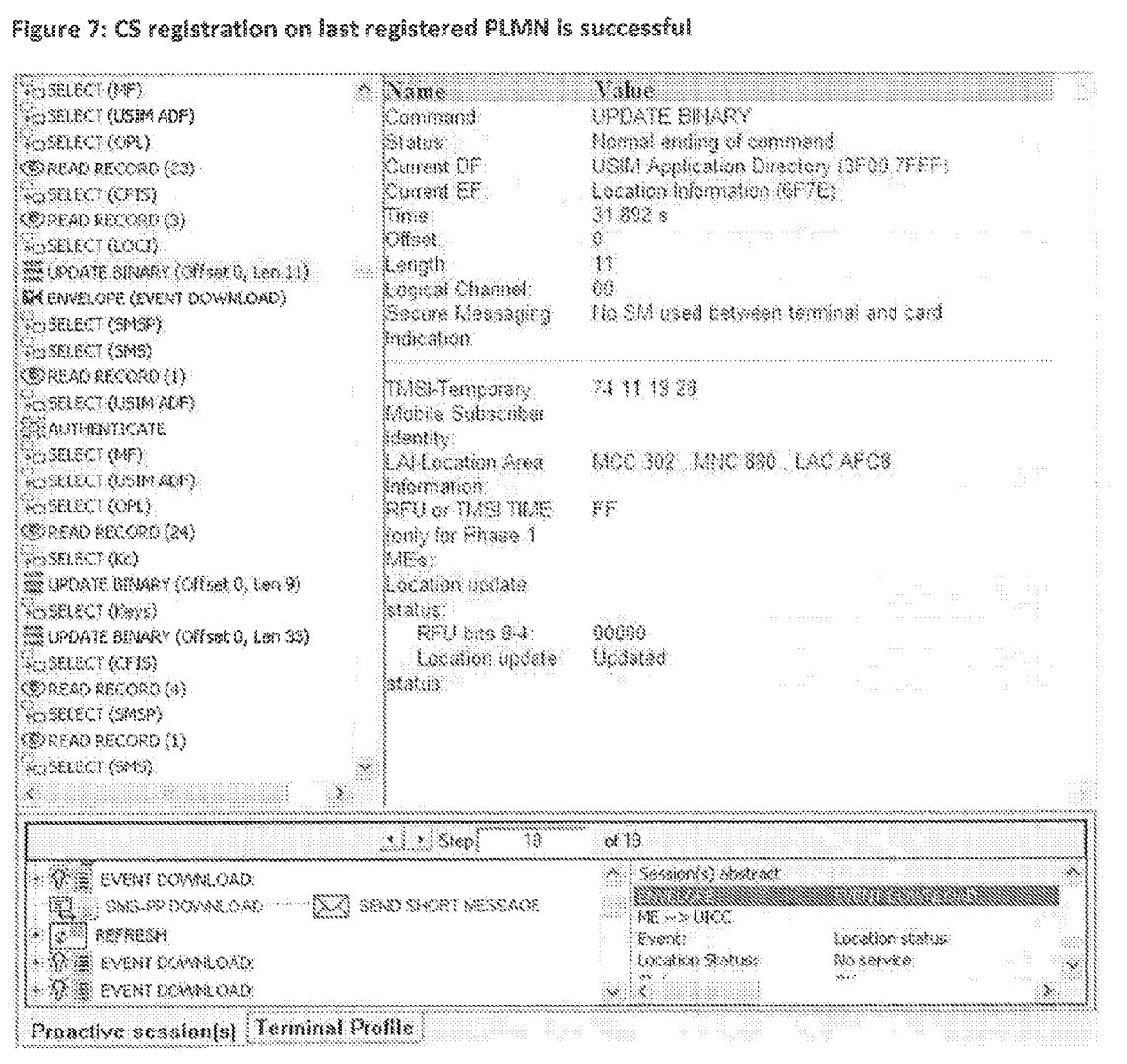

FIG. 7 shows the ME registered successfully on the CS domain of the non-preferred visited PLMN 302-880 @ 31.892 s, as indicted by the updated TMSI value in the EF_LOCI file and Location update status showing "updated".

Figure 8:
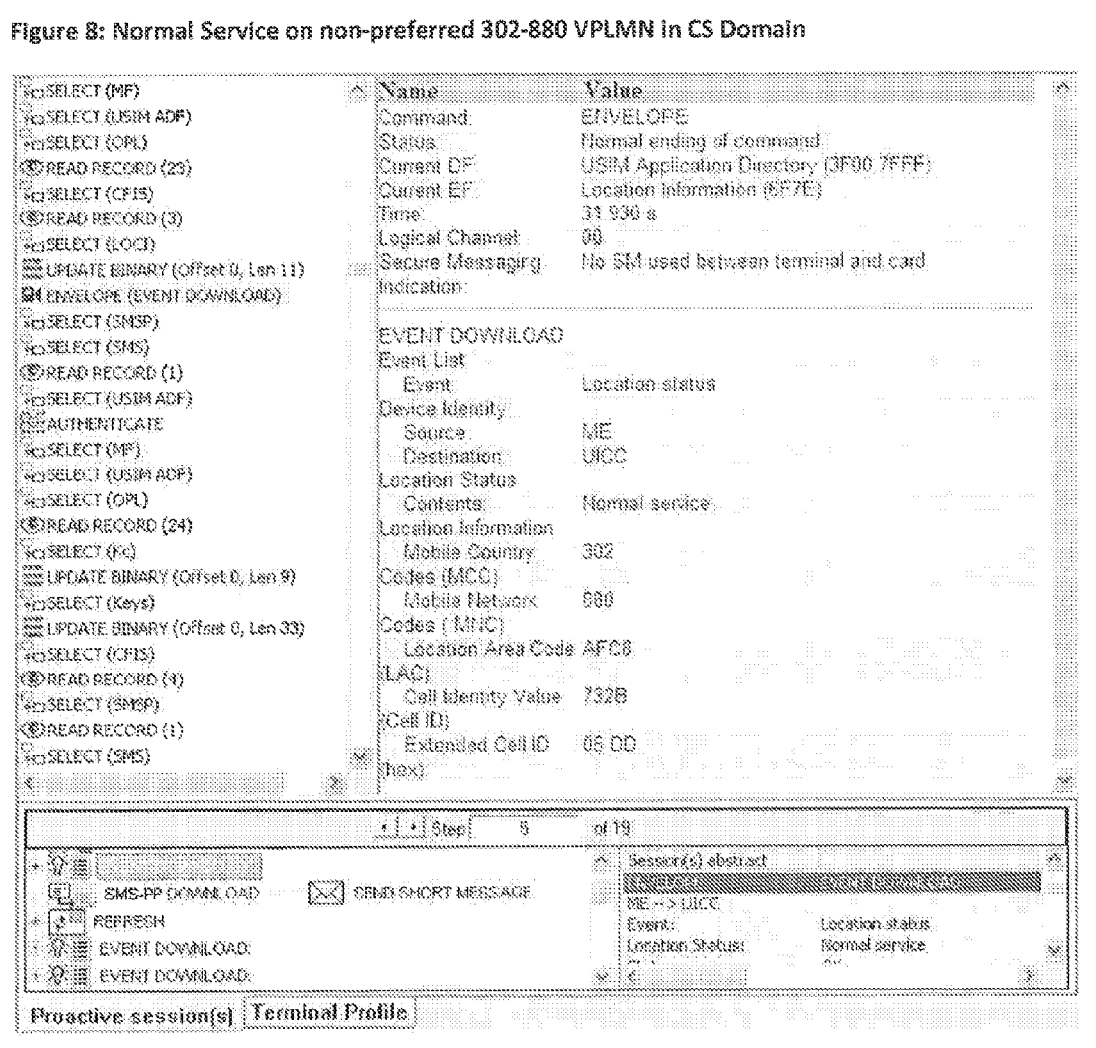

FIG. 8 shows the ME indicating to the UICC that it is now in Normal Service @ 31.930 s, which in this case is only on the CS domain, as PS registration has not yet occurred.

Figure 9:
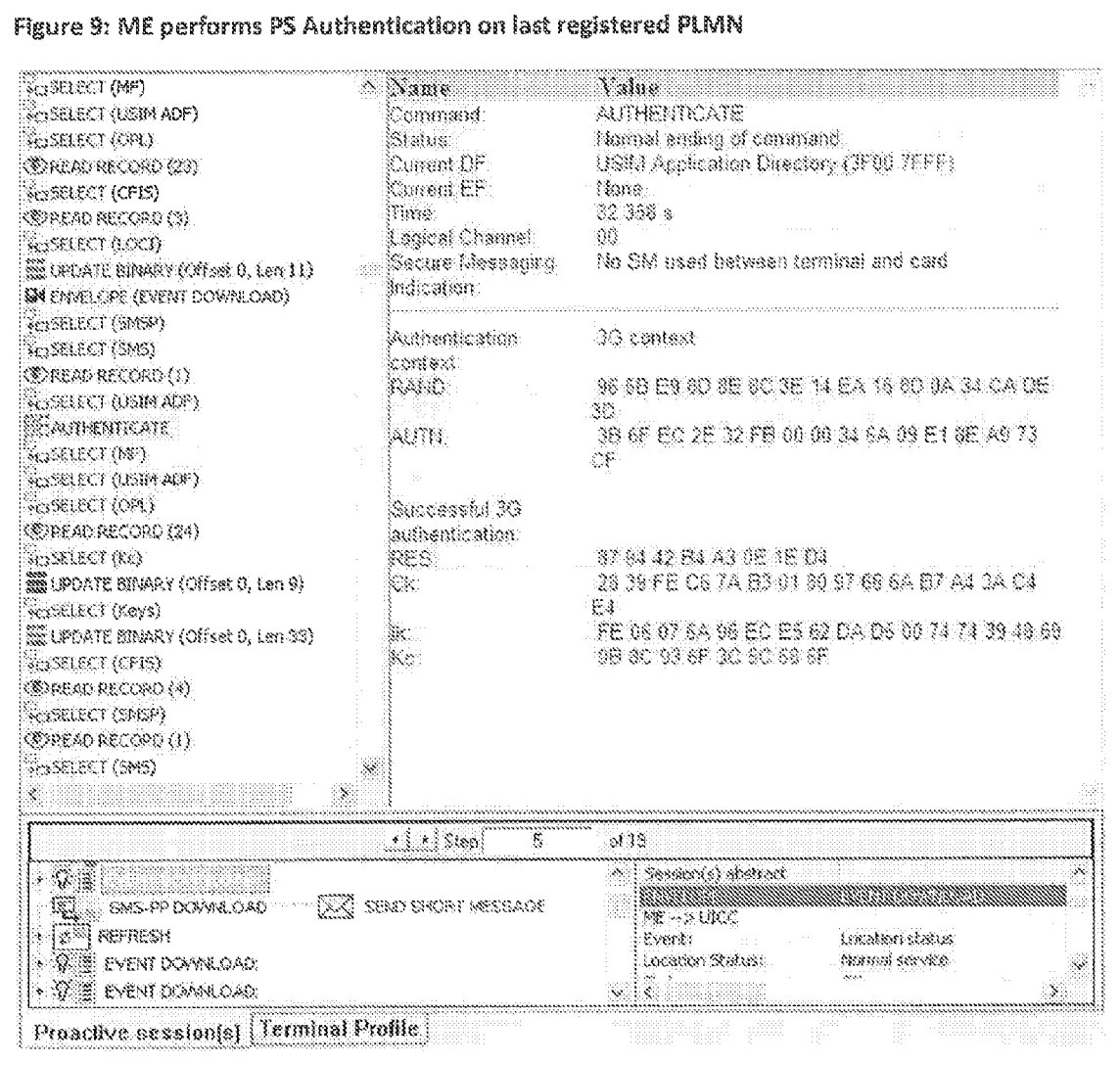

FIG. 9 shows the ME performing PS Authentication @ 32.358 s.

Figure 10:
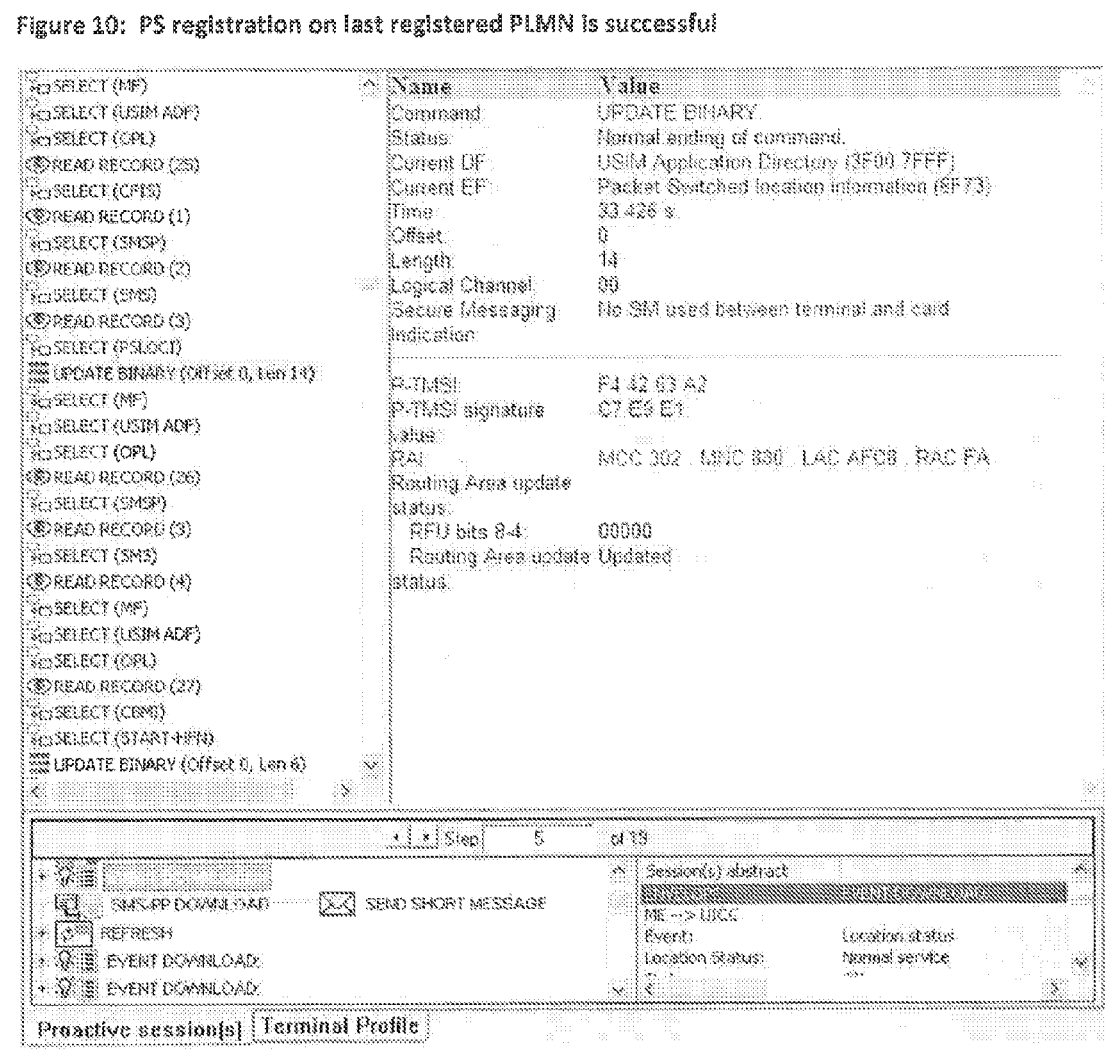

FIG. 10 shows the ME registered successfully on the PS domain of the non-preferred visited PLMN 302-880 @ 33.426 s, as indicted by the updated P-TMSI value in the EF_PSLOCI file and Routing Area update status showing "updated". This FIG. can be referenced to Step 1 of FIG. 1, as the UE at this point is now fully registered on both the CS and PS domain on the non-preferred VPLMN.

FIG. 11 shows an SMS being sent to the ME @ 92.242 s. This SMS will update the EF_LOCI file on the UICC and instruct the UICC to send a REFRESH to the ME. This FIG. can be referenced to Step 2 of FIG. 1.

Figure 12:
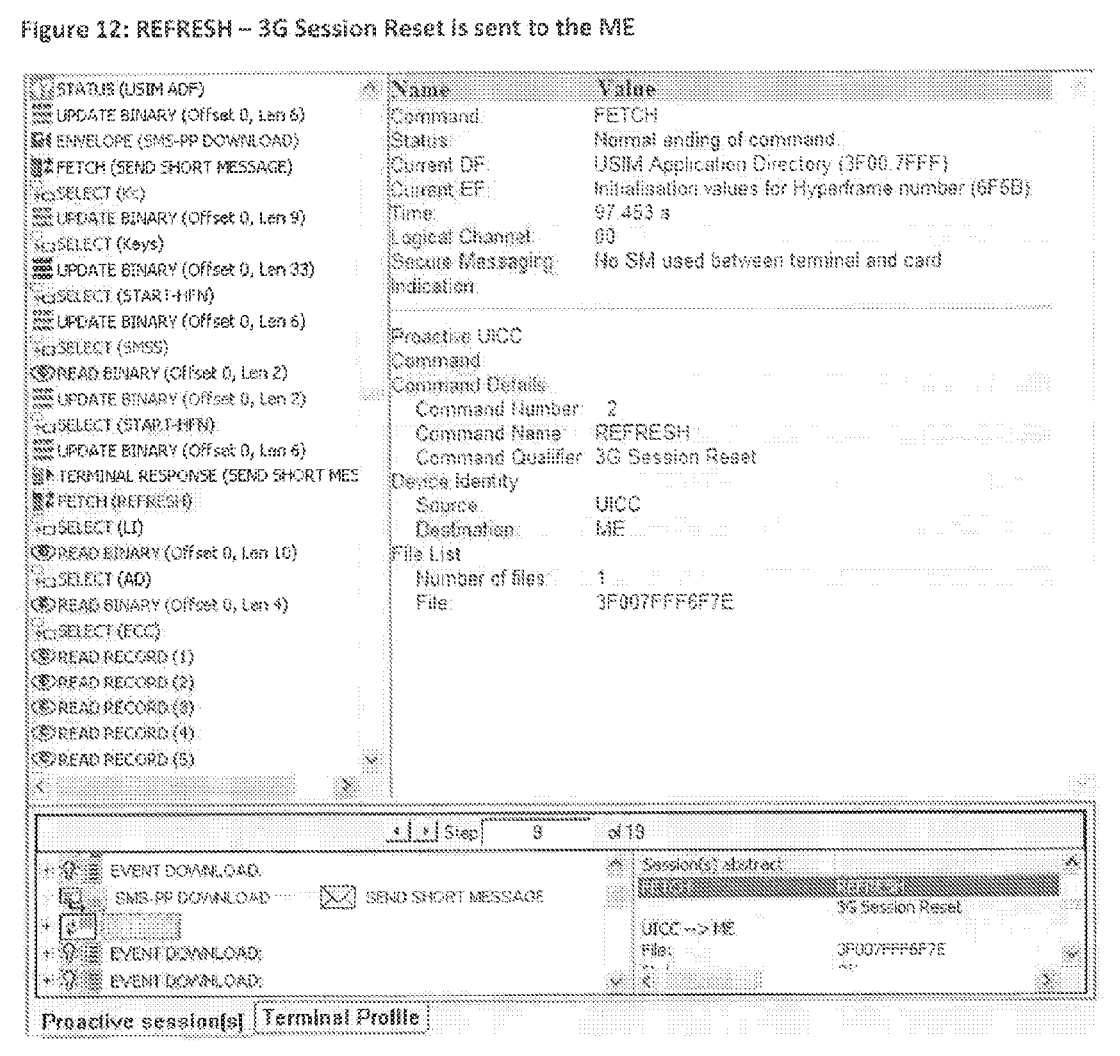

FIG. 12 shows the UICC sending REFRESH—3 G Session Reset to the ME @ 97.453 s. The file path for EF_LOCI is shown in the REFRESH File List, which indicates that EF_LOCI needs to be refreshed. The REFRESH shown in the COMPRION IT3 log, can be used as the starting point to time how long it takes for the UE to register onto the preferred visited PLMN. This FIG. can be referenced to Step 4 of FIG. 1.

FIG. 13 shows the EF_LOCI being re-read by the ME @ 101.085 s, as part of the USIM Initialization process specified by REFRESH—3 G Session Reset (Step 6 in FIG. 1) following a restart (Step 5 in FIG. 1). As shown, the MCCMNC in the EF_LOCI has been updated with the preferred visited network PLMN ID 302-221. TMSI value and Location update status remains the same, which is key in order to achieve Instant Registration. This FIG. can be referenced to Step 7 of FIG. 1.

Figure 14:
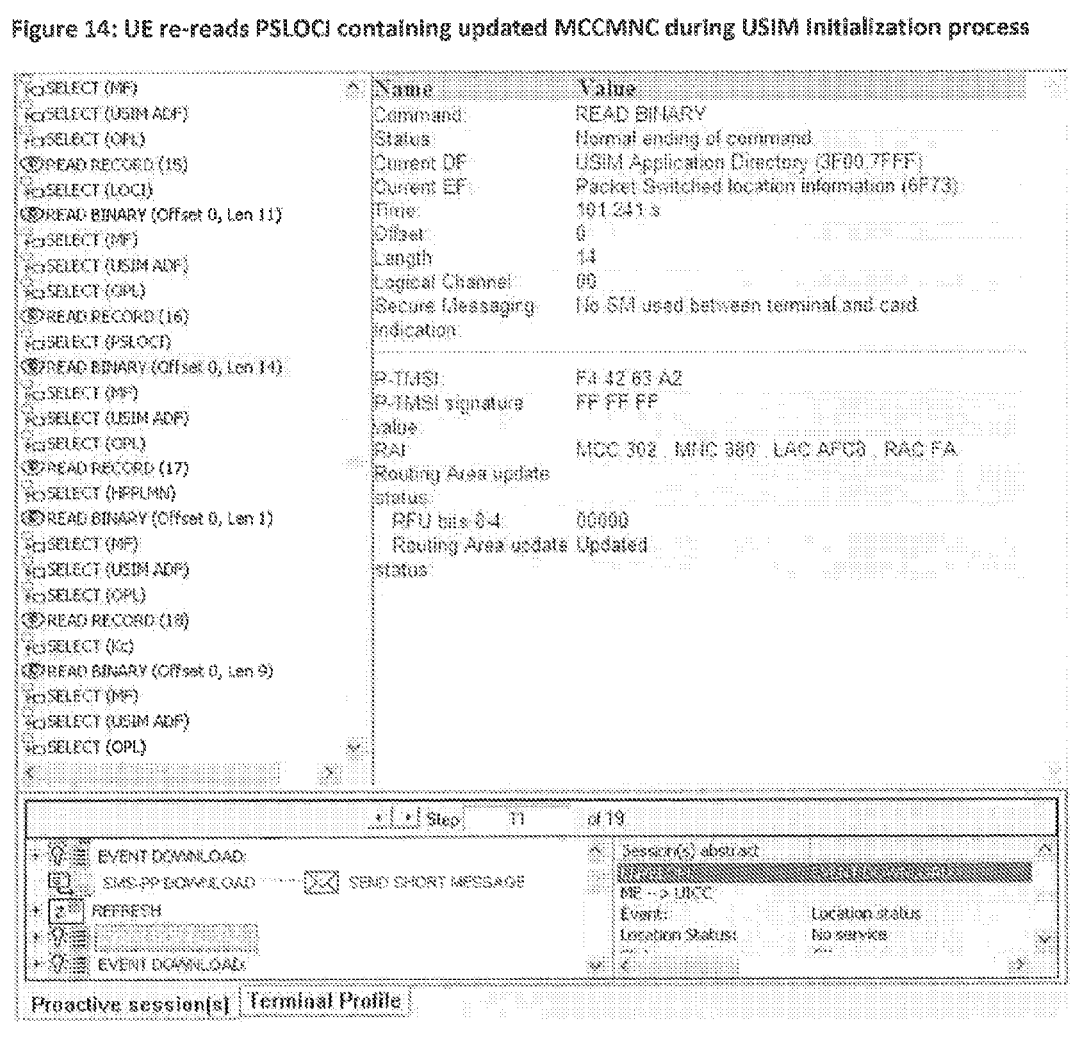

FIG. 14 shows the EF_PSLOCI being re-read by the ME @ 101.241 s, again as part of the USIM Initialization process specified by REFRESH—3 G Session Reset. As shown, the EF_PSLOCI has not been updated and the MCCMNC, P-TMSI value and Routing Area update status remains the same. However, it is not required to update the EF_PSLOCI, as registration on the CS domain via MCCMNC update in EF_LOCI, will force a PS registration if allowed by the visited network. This FIG. can be referenced to Step 7 of FIG. 1.

Figure 15:
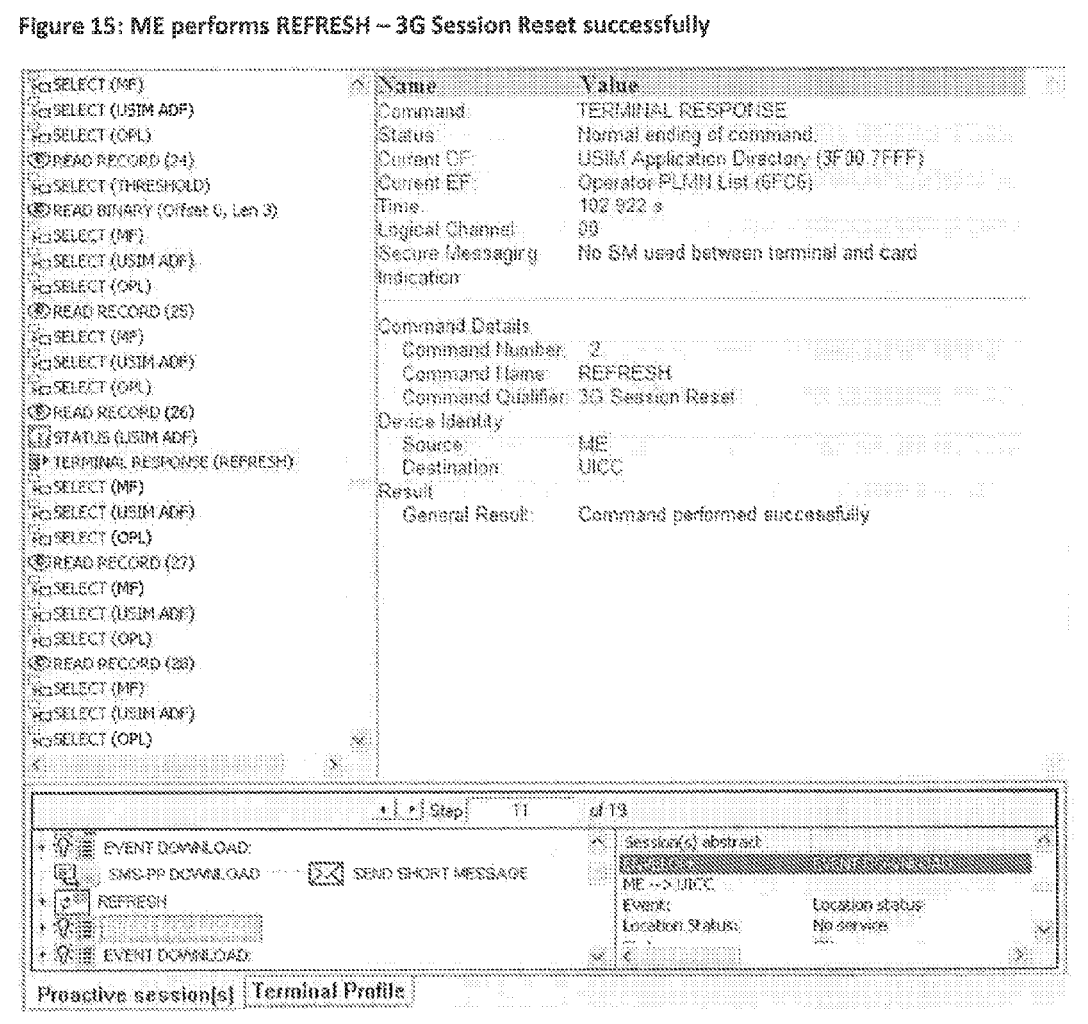
Figure 16:
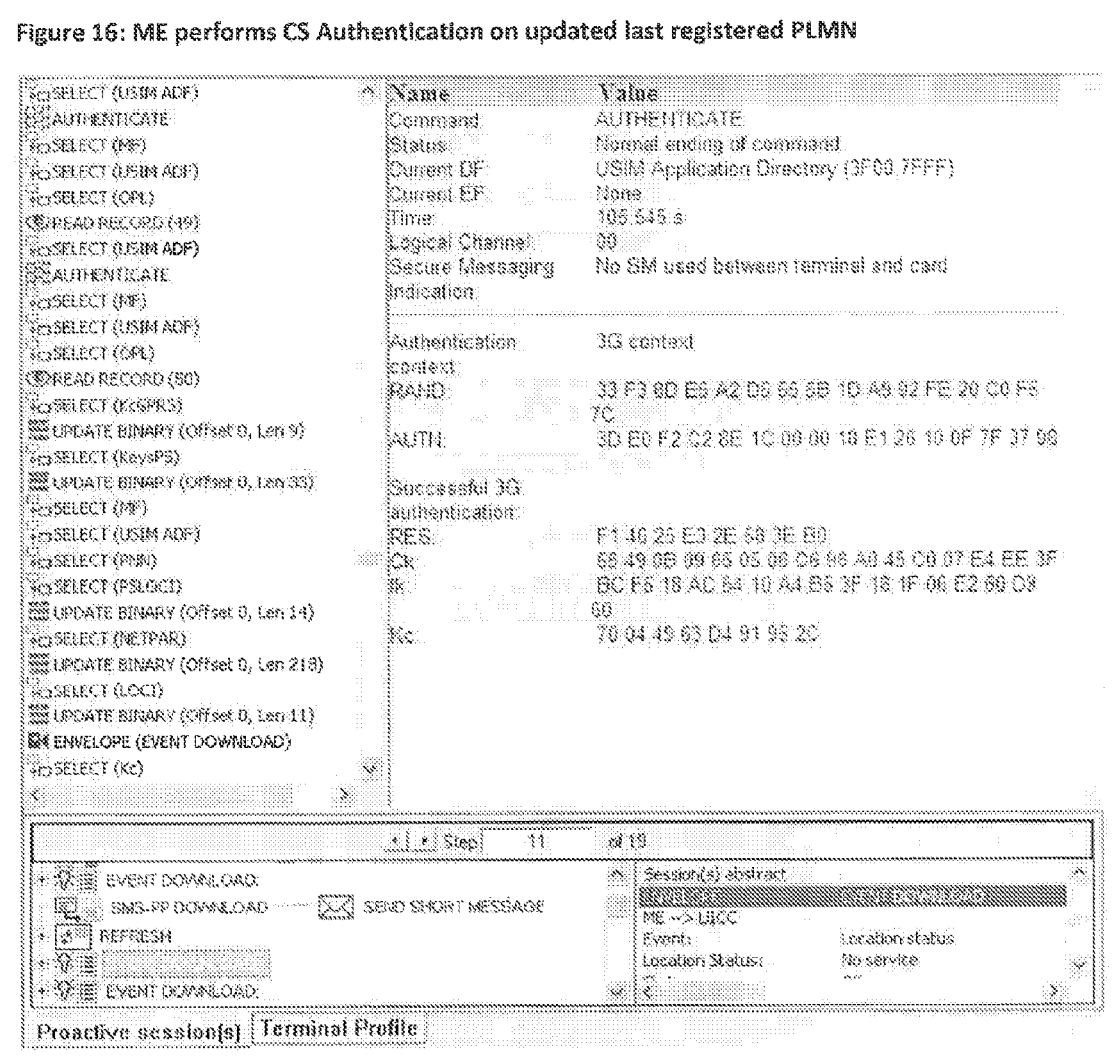

FIG. 15 shows that the ME has performed the REFRESH—3G Session Reset successfully, as depicted by the TERMINAL RESPONSE @ 102.922 s FIG. 16 shows the ME performing CS Authentication @ 105.545 s. This FIG. can he referenced to Step 8 of FIG. 1.

Figure 17:
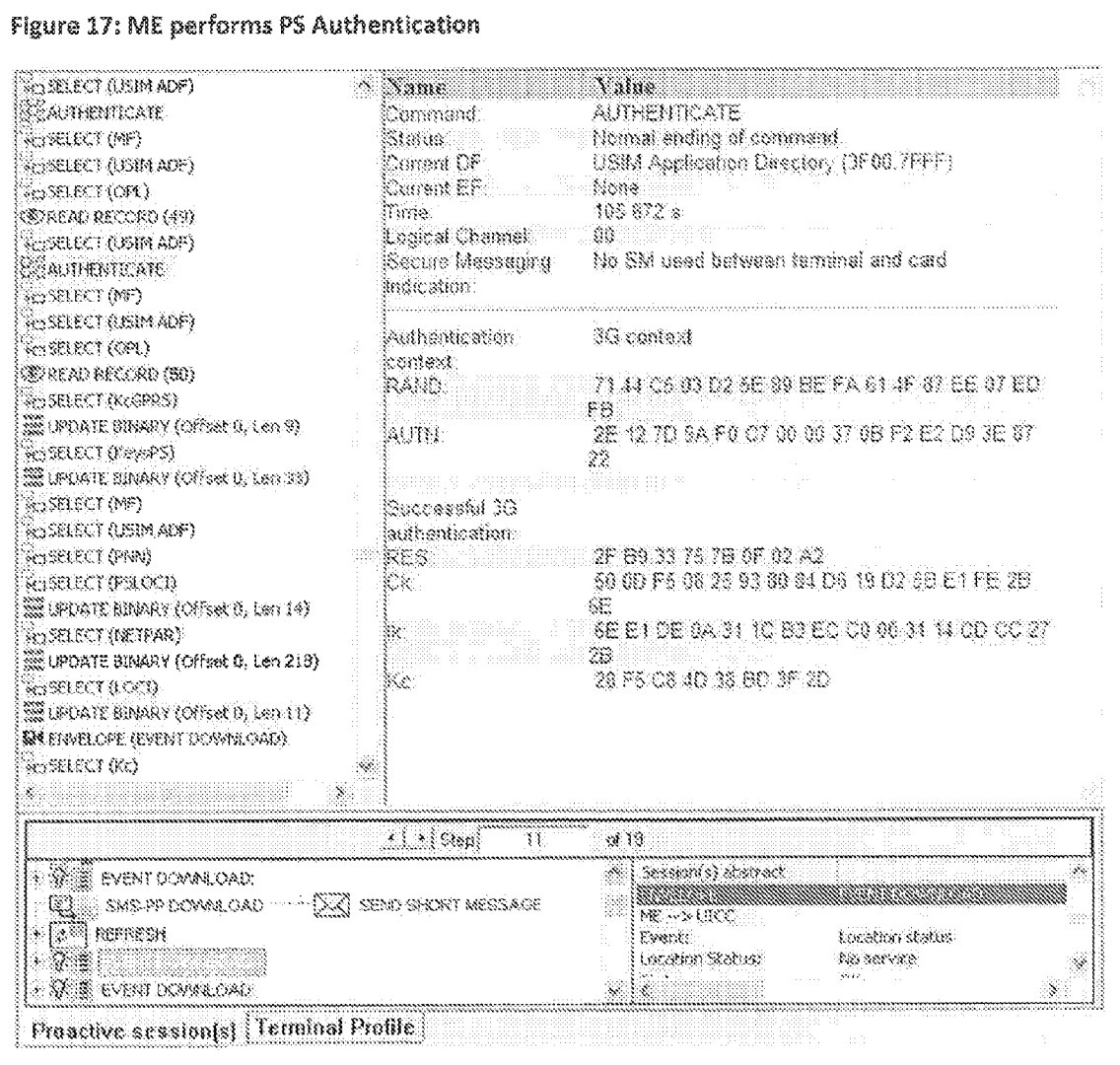

FIG. 17 shows the ME performing PS Authentication @ 105.872 s.

Figure 18:
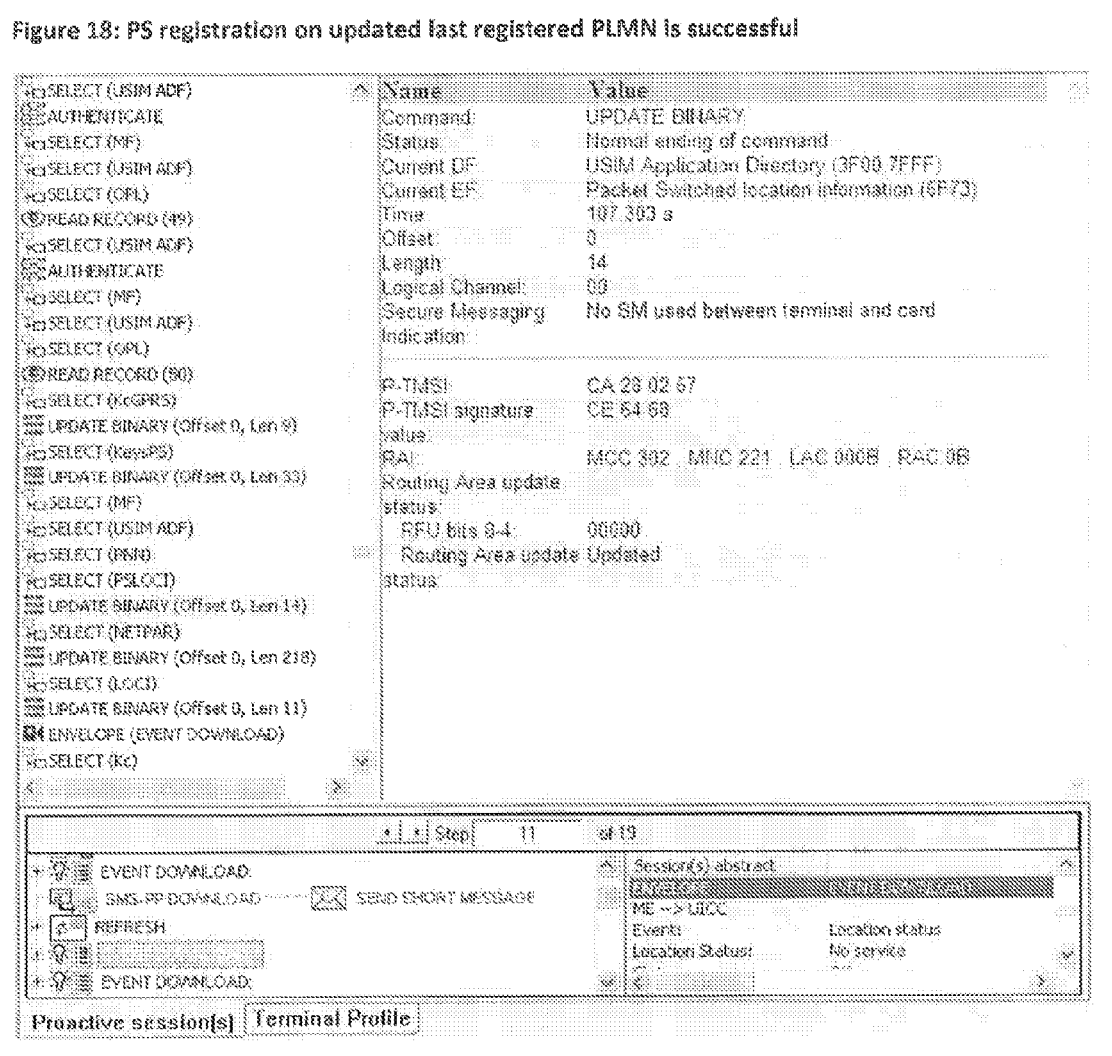

FIG. 18 shows the ME registered successfully on the PS domain of the preferred visited PLMN 302-221 @ 107.303 s, as indicted by the updated P-TMSI value in the EF_PSLOCI file and Routing Area update status showing "updated."

Figure 19:
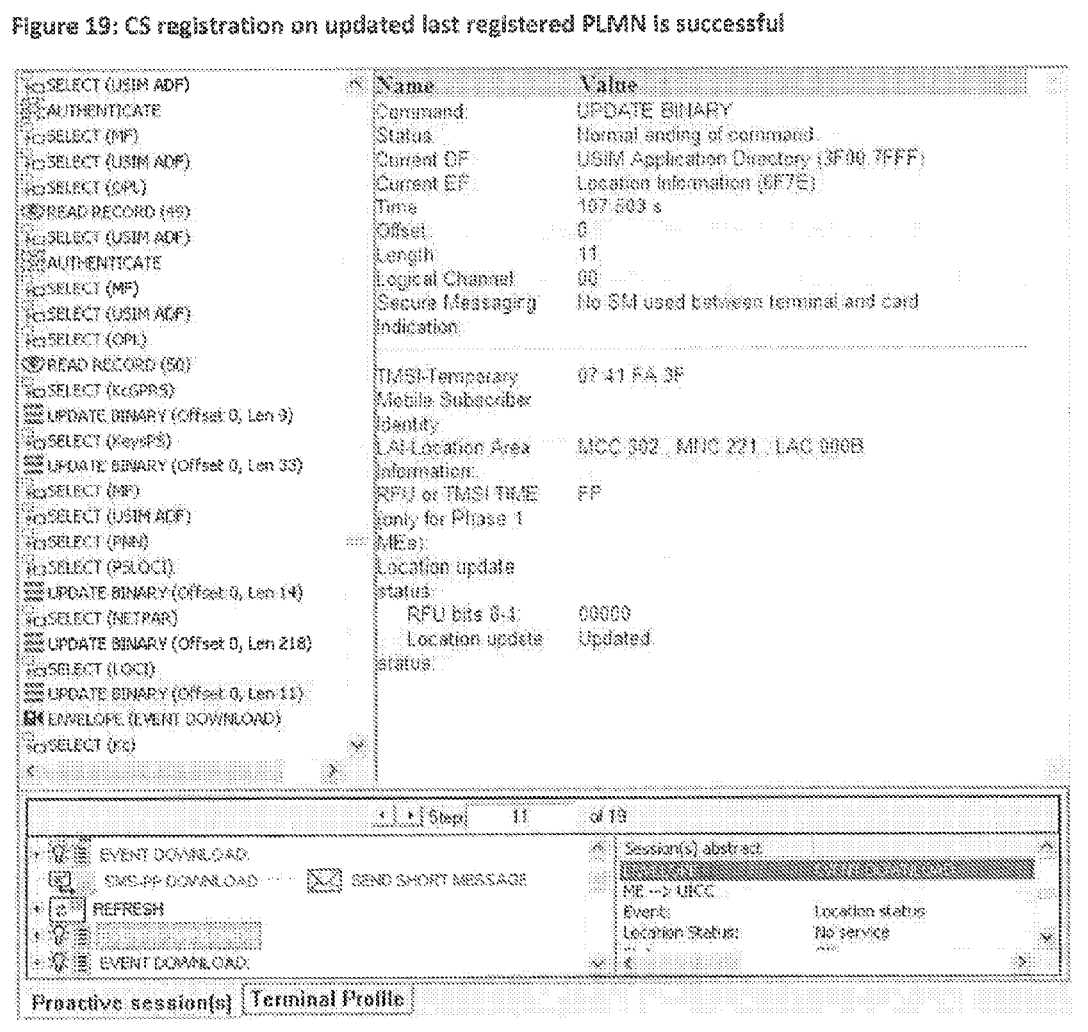

FIG. 19 shows the ME registered successfully on the CS domain of the preferred visited PLMN 302-221 @ 107.503 s, as indicted by the updated TMSI value in the EF_LOCI file and Location update status showing "updated."

FIG. 20 shows the ME fully registered on both CS and PS domain of the preferred visited PLMN 310-221 @ 107.534 s, as depicted by the EVENT DOWNLOAD—Normal Service sent from the ME to the UICC. This shows that the UE registered immediately after the REFRESH onto the preferred visited PLMN in 10.081 s. This FIG. can be referenced in Step 9 of FIG. 1.

FIG. 21 shows the interaction between the UICC and ME. Step 1 shows the ME registered on non-preferred 302880 PLMN as read from the LOCI file in the UICC. Step 2A shows the MCCMNC field updated in EF_LOCI, and Step 2B shows REFRESH 3 G Session Reset then sent to the ME, and Step 2C shows the ME going into No Service briefly as it performs the REFRESH. Step 3 shows the ME registered on the preferred 302221 PLMN, and all values in EF_LOCI are updated.

ABBREVIATIONS used herein:
3GPP 3rd Generation Partnership Program
ADF Application Dedicated File
CS Circuit switched
EF Elementary File
GUI Graphic User Interface
HPLMN Home Public Land Mobile Network
HPPLMN Higher Priority Public Land Mobile Network
IMSI International Mobile Subscriber Identity
LAC Location Area Code
LOCI Location Information
ME Mobile Equipment
MCC Mobile Country Code
MM Mobility Management
MNC Mobile Network Code
MS Mobile Station
OPLMNwAcT Operator Public Land Mobile Network with Access Technology
OTA Over the Air
PLMN Public Land Mobile Network
PS Packet switched
PSLOCI Packet switched Location Information
P-TMSI Packet Temporary Mobile Subscriber Identity
SIM Subscriber Identity Module
SMS Short Message Service
TMSI Temporary Mobile Subscriber Identity
TR Technical Recommendation
TS Technical Specification
UE User Equipment
UI User Interface
UICC Universal Integrated Circuit Card
USIM Universal Subscriber Identity Module
VPLMN Visited Public Land Mobile Network Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A method of registration of a roaming user equipment (UE) in Automatic Network Selection mode onto a preferred Visited Public Land Mobile Network (VPLMN), in which the UE comprises a Universal Integrated Circuit Card (UICC) and a mobile equipment (ME), the method comprising overwriting an entry comprising a Mobile Country Code Mobile Network Code (MCCMNC) in one or more elementary files containing location information in the UICC with identification for the preferred VPLMN; and
sending to the ME a REFRESH—3 G Session Reset with a REFRESH File List listing the one or more elementary files;
wherein registration of the UE onto the available preferred VPLMN is accomplished within 30 seconds taken from the time that the REFRESH—3 G Session Reset is sent to the ME.

2. The method of claim 1 in which before the method is carried out the UE is registered on a non-preferred VPLMN.

3. The method of claim 1 in which the identification for the preferred VPLMN is a Public Land Mobile Network identification (PLMN ID) for the preferred VPLMN.

4. The method of claim 1, wherein the registration is accomplished seamlessly, in which the ME does not power-cycle itself after REFRESH—3G Session Reset is sent to the ME.

5. The method of claim 1, wherein the ME complies with all of the following 3GPP requirements:
(a) 3GPP TS 31.111 clause 6.4.7—REFRESH;
(b) 3GPP TS 23.122 clause 4.8—MM Restart procedures; and
(c) 3GPP TS 23.122 clause 4.4.3.1—At switch on or recovery from lack of coverage.

6. The method of claim 1 further comprising updating an Elementary File Operator Public Land Mobile Network with Access Technology (EF_OPLMNwAcT) with the preferred Public Land Mobile Network identification (PLMN ID) and Access Technology of the preferred VPLMN.

7. The method of claim 6 in which the preferred PLMN ID is updated as the highest priority entry in the EF_OPLMNwAcT.

8. The method of claim 6 further comprising, after updating the EF_OPLMNwAcT, immediately sending REFRESH—3G Session Reset (containing the one or more elementary files and EF_OPLMNwAcT in the REFRESH File List) to the ME.

9. The method of claim 1 further comprising the steps of:
receiving a Mobile Country Code (MCC) via a user interface on the ME;
comparing the received MCC with MCCs of Public Land Mobile Network identifications (PLMN IDs) stored in a PLMN list; and selecting the preferred VPLMN by selecting a highest priority PLMN ID in the PLMN list whose MCC is the first instance that matches the MCC received via the User Interface of the ME.

10. The method of claim 1 in which the steps are carried out using a commercial Over the Air (OTA) solution or a Subscriber Identity Module (SIM) Toolkit application.

11. A method of registration of a roaming user equipment (UE) in Automatic Network Selection mode onto a preferred Visited Public Land Mobile Network (VPLMN), in which the UE comprises a Universal Integrated Circuit Card (UICC) and a mobile equipment (ME), the method comprising overwriting an entry comprising a Mobile Country Code Mobile Network Code (MCCMNC) in one or more elementary files containing location information in the UICC with identification for the preferred VPLMN; and sending to the ME a REFRESH—3G Session Reset with a REFRESH File List listing the one or more elementary files;

in which the one or more elementary files comprise Elementary File Location Information (EF_LOCI) in a Universal Subscriber Identity Module Application Dedicated File (USIM ADF) within a UICC; and in which Mobile Country Code Mobile Network Code (MCCMNC) content of EF_LOCI comprises bytes 5, 6, and 7 of File ID 6F7E.

12. A method of registration of a roaming user equipment (UE) in Automatic Network Selection mode onto a preferred Visited Public Land Mobile Network (VPLMN), in which the UE comprises a Universal Integrated Circuit Card (UICC) and a mobile equipment (ME), the method comprising overwriting an entry comprising a Mobile Country Code Mobile Network Code (MCCMNC) in one or more elementary files containing location information in the UICC with identification for the preferred VPLMN; and sending to the ME a REFRESH—3G Session Reset with a REFRESH File List listing the one or more elementary files;

in which the one or more elementary files comprise Elementary File Location Information (EF_LOCI) in a Universal Subscriber Identity Module Application Dedicated File (USIM ADF) within a UICC; and in which there is a valid Temporary Mobile Subscriber Identity (TMSI) value available in EF_LOCI in the UICC.

13. A method of registration of a roaming user equipment (UE) in Automatic Network Selection mode onto a preferred Visited Public Land Mobile Network (VPLMN), in which the UE comprises a Universal Integrated Circuit Card (UICC) and a mobile equipment (ME), the method comprising overwriting an entry comprising a Mobile Country Code Mobile Network Code (MCCMNC) in one or more elementary files containing location information in the UICC with identification for the preferred VPLMN; and sending to the ME a REFRESH—3G Session Reset with a REFRESH File List listing the one or more elementary files;

in which the one or more elementary files comprise Elementary File Location Information (EF_LOCI) in a Universal Subscriber Identity Module Application Dedicated File (USIM ADF) within a UICC; and in which, in the UICC, bytes 1 to 4 of File ID 6F7E have not been overwritten with FF FF FF FF.

14. A method of registration of a roaming user equipment (UE) in Automatic Network Selection mode onto a preferred Visited Public Land Mobile Network (VPLMN), in which the UE comprises a Universal Integrated Circuit Card (UICC) and a mobile equipment (ME), the method comprising overwriting an entry comprising a Mobile Country Code Mobile Network Code (MCCMNC) in one or more elementary files containing location information in the UICC with identification for the preferred VPLMN; and sending to the ME a REFRESH—3G Session Reset with a REFRESH File List listing the one or more elementary files;

in which the one or more elementary files comprise Elementary File Location Information (EF_LOCI) in a Universal Subscriber Identity Module Application Dedicated File (USIM ADF) within a UICC; and in which, in the UICC, the Location update status in EF_LOCI is set to "updated."

15. The method of claim 14 in which, in the UICC, byte 11 of File ID 6F7E is set to 00.

16. A user equipment (UE) configured to carry out a method of registration onto a preferred Visited Public Land Mobile Network (VPLMN), in which the UE is in Automatic Network Selection mode and comprises a Universal Integrated Circuit Card (UICC) and a mobile equipment (ME), wherein the UE is configured to overwrite an entry comprising a Mobile Country Code Mobile Network Code (MCCMNC) in one or more elementary files containing location information in the UICC with identification for the preferred VPLMN; and the ME is configured to receive a REFRESH—3G Session Reset with a REFRESH File List listing the one or more elementary files:, wherein registration of the UE onto the preferred VPLMN is accomplished within 30 seconds taken from the time that the REFRESH—3G Session Reset is sent to the ME.

* * * * *